Aug. 1, 1950

D. A. BECK ET AL 2,517,524

BOUNDARY LAYER CONTROL

Filed Feb. 10, 1945

Inventor
Derwood A. Beck
Edwyn A. Eddy

By  H H Oldham
Attorney

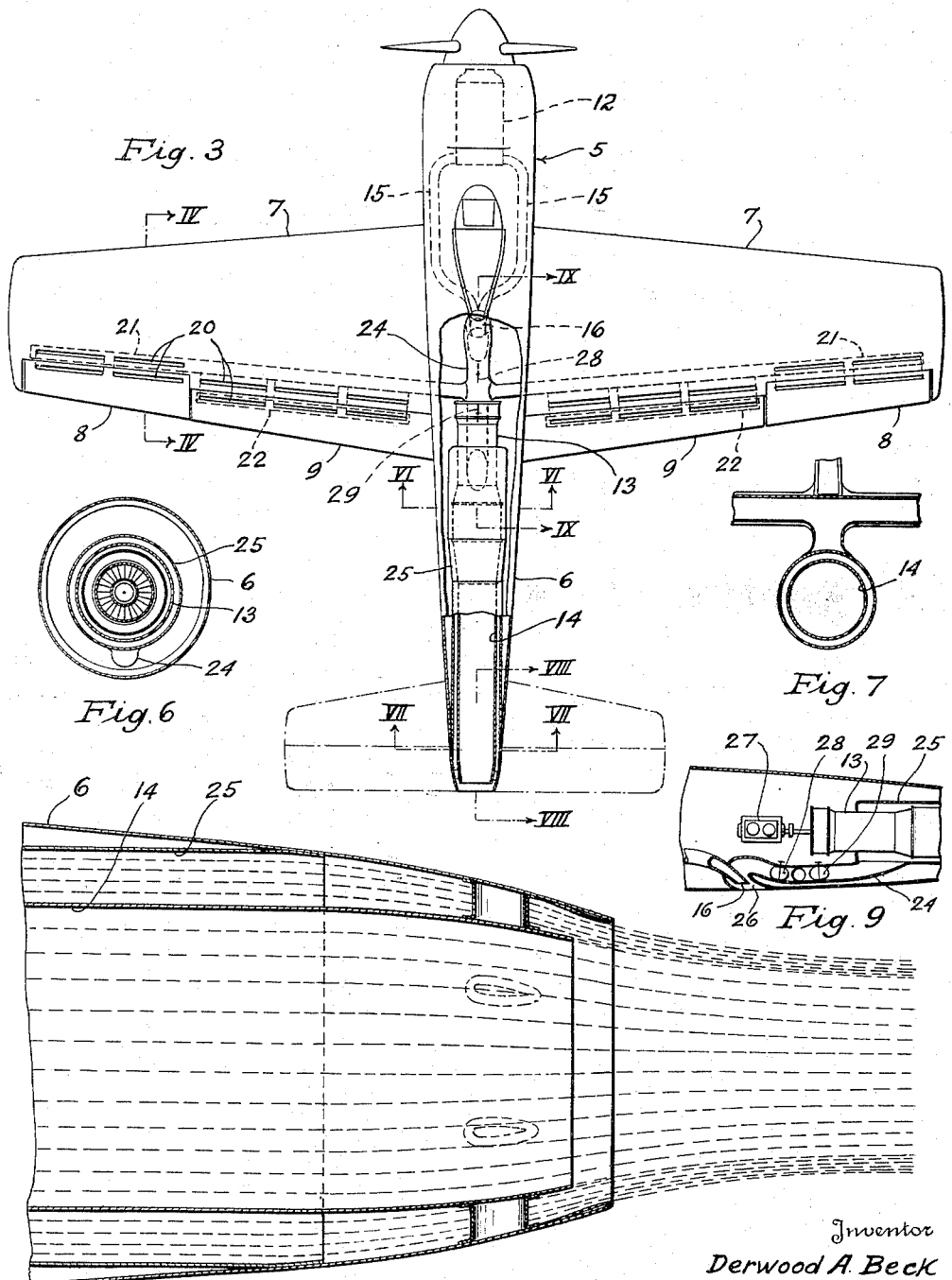

Patented Aug. 1, 1950

2,517,524

UNITED STATES PATENT OFFICE 2,517,524

BOUNDARY LAYER CONTROL

Derwood A. Beck, Seville, and Edwyn A. Eddy, Massillon, Ohio, assignors to Goodyear Aircraft Corporation, Akron, Ohio, a corporation of Delaware Application February 10, 1945, Serial No. 577,258

3 Claims. (Cl. 244—40)

This invention relates to boundary layer control of aircraft, and in particular to such control induced by suction.

Constructions for boundary layer control for aircraft as known heretofore have used various means for the purpose of increasing either the lift or the speed of the craft or both, for instance, by slotting the wings of an airplane and letting air pass from the bottom to the top of wing to favorably influence the boundary layer. In some cases air was forced through ducts inside the wings to escape rearwardly through slots in the top cover thereof, and in other cases the boundary layer was sucked off through slots from the top of the wings. In both cases, that was accomplished by the use of a power driven pump, involving considerable weight, power, and cost.

It is the general object of the invention to avoid and overcome the foregoing and other difficulties of and objections to prior art practices by the provision of a simple arrangement which, directly employs the jet action of the exhaust gases of a power engine, either of the internal or external combustion type, including compressor-turbine engines, gas turbines, rocket propulsion, piston, as well as, steam engines, to create the necessary suction at any desirable place on the surface of an aircraft where the boundary layer is intended to be controlled. Such places are particularly the wings, ailerons, flaps and tail surfaces of an airplane.

Another object of the invention is to save weight and to avoid the use of extra power means for inducing suction in order to remove the boundary layer.

Another object of the invention is to use the sucked-off boundary layer air for cooling the power unit, particularly jet units, as well as cooling the exhaust pipe or jet.

Another object of the invention is to keep the suction power of the exhaust of a jet engine for removing the boundary layer alive for emergency landings.

The aforesaid objects of the invention and other objects which will become apparent as the description proceeds, are achieved by the provision whereby the exhaust gases of the power engines, either of the conventional or of the jet type, internal or external combustion engine, are utilized to furnish the power for sucking away the boundary layer air from any desired portion of an aircraft cover surface, and which air may be advantageously used for cooling the engine, especially such of the jet type without in the least decreasing the jet action of the exhaust.

For a better understanding of the invention reference should be had to the accompanying drawings, wherein Fig. 1 shows diagrammatically the cross section of a conventional airfoil, for instance, an airplane wing, indicating the air flow around the wing and the resulting boundary layer in flight under ordinary conditions.

Fig. 3 is a plan view of an airplane incorporating the invention, partly shown in section and with a portion of the fuselage uncovered.

Fig. 6 is a cross-sectional view taken on line VI—VI of Fig. 3.

Fig. 7 is a cross-sectional view taken on line VII—VII of Fig. 3.

Fig. 8 is an enlarged longitudinal cross-sectional view of the rear end of the fuselage, and Fig. 9 is, in large scale, a longitudinal cross-sectional view taken on line IX—IX of Fig. 3.

Although the principles of the invention are broadly applicable to the removal of the boundary layer from any desired portion of the surface of an aircraft, the invention is usually employed in conjunction with airplane wings and ailerons and has been so illustrated and will be so described.

Figure 1:
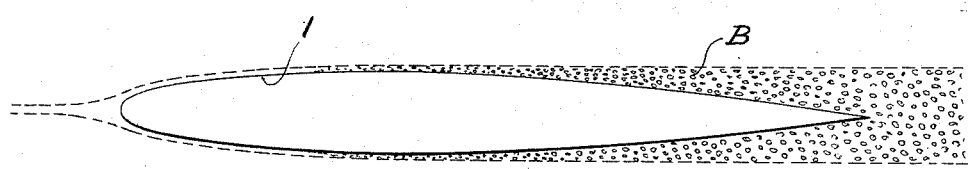
Figure 2:
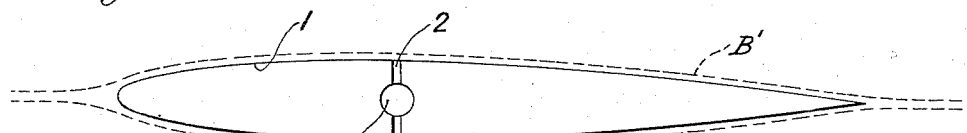
Fig. 2 is a similar cross-sectional view but including an upper and a lower slot for sucking in the boundary layer through a suction pipe, and indicating the modified air flow behind the slot.

With specific reference to the form of the invention illustrated in the drawings, the numeral 1 in Fig. 1 indicates a diagrammatically shown conventional airfoil surrounded by the usual boundary layer B the greatest portion of which becomes turbulent and separates the laminar air flow from the wing section. Whereas, the improved condition, according to the invention, is shown in Fig. 2, in which the wing 1 is provided with slots 2 communicating with a suction duct 3 and the turbulent boundary layer has been drawn off and the air follows a more laminar flow $B^1$ producing greater lift and less air resistance.

In Fig. 3 the airplane 5, indicated as a whole, consists of a fuselage 6 to which are attached wings 7 provided with ailerons 8 and 9 attached thereto by hinges 10. Each one of these ailerons may consist of a single section as shown in deflected condition in Fig. 4 or of two or more sections attached to the wings $7^a$ as shown in Fig. 5 and indicated by the numerals 8ª and 8ᵇ. For obtaining a smooth airflow over the top of the wings, when the ailerons are deflected, the gaps between the wings and ailerons (Fig. 4) and also between aileron sections (Fig. 5) are overbridged by strips 11 and 11ª and 11ᵇ, respectively. These strips may be made of stiff material and hinged to the rear edges of their respective supports, or of flexible and resilient material and fixedly attached to these edges to provide a continuous streamline shape. An internal combustion motor 12 of conventional type, driving a propeller, is located in the front portion of the fuselage, and rearwardly spaced therefrom in the fuselage is an engine 13 of the compressor turbo type which furnishes the driving power by jet action of its exhaust passing through the jet tube or nozzle 14 connected to the turbine end of the jet engine and extending substantially to the rear end of the fuselage, where the exhaust escapes into the atmosphere. On the other hand, the exhaust of the motor 12 passes through the exhaust pipes 15 and escapes through their joint nozzle 16 into the atmosphere.

Figure 4:
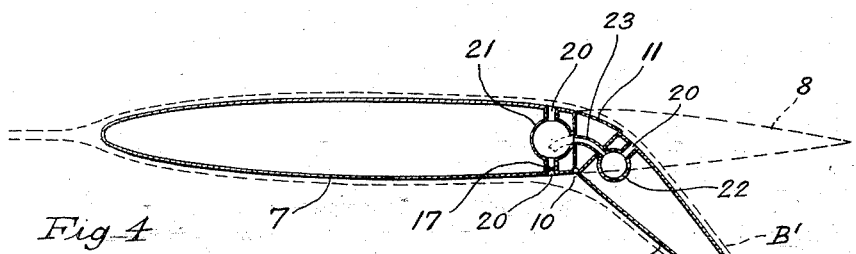
Fig. 4 is a cross-sectional view taken on the line IV—IV of Fig. 3.
Figure 5:
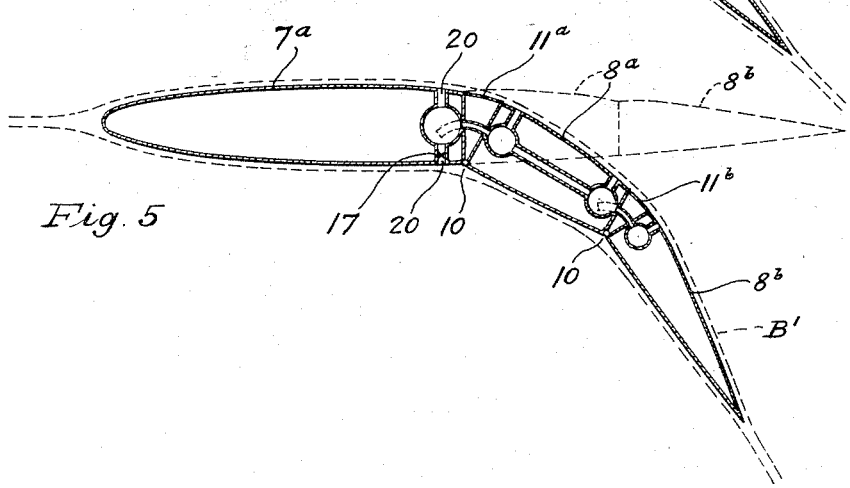
Fig. 5 is a modification of Fig. 4.

The wings 7 and the ailerons 8 and 9 which may take the form, as shown in Fig. 4 or in Fig. 5, are provided with slots 20 leading into the suction ducts 21 and 22 of the wings and ailerons, respectively, which ducts communicate with each other by arcuate telescoping extensions or by flexible connections 23. The ducts 21 in the wings join the longitudinal duct 24 connecting to the casing 25 which circumferentially surrounds the jet motor 13 and the jet nozzle 14 the end of which, together with the casing 25 or its extension formed by the fuselage cover, acts as a suction pump for the boundary layer air by the jet action of the exhaust. With this arrangement is connected the additional advantage of cooling the jet engine as well as the jet tube. For regulating the suction at the lower wing slots 20 valves or adjustable shutters 17 are provided, however, it is quite possible that these slots are entirely dispensable.

Through the outlet 26 of the forward portion of the longitudinal suction duct 24 is led the exhaust nozzle 16 of the forward engine which together can also be used as suction means for the boundary layer passing through the wing slots, either together with that of the jet engine or by itself.

It should be understood that the plane can be flown with both engines or only by each single engine, the exhaust of each of which being capable of providing the necessary suction power for absorbing the boundary layer.

Jet motors usually are provided with a starter motor 27 which in this case may be an emergency gasoline engine to turn the compressor and turbine and to produce sufficient pressure which, when the jet engine runs empty, that is, without fuel, will have enough suction power for removing the boundary layer. Thereby, in an emergency landing, when the fuel has been almost exhausted and is too low for supplying the main engine, the lifting power of the wings will be kept sufficiently high to avoid a landing crash.

For regulating the suction power through the wing slots and, accordingly, the lifting power of the airplane, valves 28 and 29 are provided in the longitudinal suction duct 24 which permit shutting off, if desired, either one of the engines, when out of order, from the suction ducts. The power of the suction pumps may also be regulated by making the space between the suction and exhaust nozzles adjustable. Of course, the airplane may be equipped with any number of engines of any type expelling exhaust gases, including steam engines, and they may be installed in the fuselage or in separate nacelles in any combination and arrangement.

Even though it is believed the operation of the invention will be apparent from the foregoing description, a brief review thereof will now be made for purposes of summary and simplification. In particular it must be pointed out that the construction of the installation does not require for its operation any moving parts and no auxiliary pumping device, instead, a fixed nozzle system using the exhaust gases of the engines to produce the necessary suction for removing the boundary layer air is being employed. This method is especially advantageous in the case of a jet engine where the full force of the combustion gases is available to create the desired suction.

It will be recognized that the objects of the invention have been achieved in a most simple way to employ the forces inherent in the exhaust gases not only efficiently but that on the other hand the inhaled boundary layer air serves in addition as a cooling agent for the jet engine.

While in accordance with the patent statutes one best known embodiment of the invention has been illustrated and described in detail, it is to be particularly understood that the invention is not limited thereto or thereby, but that the invention scope is defined in the appended claims.

We claim:

1. In combination in an airplane, a fuselage open at the rear, wings on said fuselage having surface openings running transverse to the airflow, a compressor-turbine jet power engine positioned longitudinally within said fuselage, an exhaust pipe extending rearwardly from said engine in a diameter substantially that of the engine and ending at a point adjacent the rear end of said fuselage, a casing closed in front extending rearwardly from the front portion of said engine and in part comprising the fuselage cover, said casing circumferentially surrounding and being radially spaced from said engine and said exhaust pipe and being adapted to act together with and at the end of said exhaust pipe as an air suction pump operated by the engine exhaust gases, and ducts connecting said wing openings with the front portion of said casing for guiding the boundary layer air of said wings sucked in by the pump action into said casing for improving the efficiency of the wings and for cooling said engine and said exhaust pipe.

2. In an airplane, a fuselage, wings secured to the fuselage, a reciprocating piston engine mounted in the front portion of the fuselage, a turbo-compressor jet engine mounted in the fuselage rearwardly and spaced from the piston engine, ailerons hinged to the trailing edge of the wings, the wings and the ailerons having their surfaces provided adjacent and along their hinged edges with suction slots, suction ducts extending from the center of the fuselage outwardly within said wings, duct means connecting said slots with the wing suction ducts, a pair of exhaust pipes extending rearwardly from said piston engine and being joined into a common outlet adjacent the bottom of the fuselage, a jet exhaust tube axially extending from the rear end of the jet engine and ending short of the fuselage rear end, a substantially cylindrical casing closed at the front forming an air jacket for the greatest portion of the jet engine and for the full length of said exhaust tube and extending somewhat beyond the rear end thereof to form therewith a suction pump operated by the exhaust from the jet engine, a longitudinal suction duct connected to said wing suction ducts and forwardly extending from the front portion of said casing but having its front end turned backwards and open to the atmosphere at the bottom of the fuselage, the outlet of the piston engine exhaust pipes running into the outlet of said longitudinal suction duct having a larger diameter to form therewith another suction pump operated by the exhaust of the piston engine, and valves inserted in the longitudinal suction duct for adjusting the degree of suction of the boundary layer air by each pump.

3. In combination in an airplane including a fuselage, wings on the fuselage, the surface of said wings being provided with suction slots placed transversely to the air stream, a reciprocating piston engine mounted within the front portion of the fuselage, a compressor-turbo jet engine mounted in the fuselage rearwardly of the piston engine, a suction pump operated by the piston engine exhaust having its outlet laterally of the fuselage, another suction pump at the end of the fuselage and being operated by the turbine jet blast, and means connecting the slots and the pumps including a control for selectively operating the pumps to remove the boundary layer of air.

DERWOOD A. BECK.
EDWYN A. EDDY.

REFERENCES CITED

The following references are of record in the file of this patent:

UNITED STATES PATENTS

| Number | Name | Date |
| --- | --- | --- |
| 2,024,274 | Campini | Dec. 17, 1935 |
| 2,041,790 | Stalker | May 26, 1936 |
| 2,340,396 | McDonnell | Feb. 1, 1944 |
| 2,351,750 | Fawkes | June 20, 1944 |
| 2,396,911 | Anxionnaz et al. | Mar. 19, 1946 |
| 2,401,941 | Lee | June 11, 1946 |
| 2,404,954 | Godsey, Jr. | July 30, 1946 |

FOREIGN PATENTS

| Number | Country | Date |
| --- | --- | --- |
| 209,435 | Great Britain | Nov. 27, 1924 |
| 390,363 | Great Britain | Apr. 6, 1933 |
| 484,405 | Great Britain | May 2, 1938 |
| 504,747 | Great Britain | May 1, 1939 |
| 886,889 | France | July 19, 1943 |

OTHER REFERENCES

Ser. No. 235,640, Bussche (A. P. C.), published May 25, 1943.